United States Patent
Qiao et al.

(10) Patent No.: US 9,819,836 B2
(45) Date of Patent: Nov. 14, 2017

(54) MECHANISM FOR AUTOMATICALLY DETERMINING INPUT PROFILES

(71) Applicants: Yue Qiao, Longmont, CO (US); Chao Ma, Boulder, CO (US); Scott R. Johnson, Erie, CO (US); Hong Li, Superior, CO (US)

(72) Inventors: Yue Qiao, Longmont, CO (US); Chao Ma, Boulder, CO (US); Scott R. Johnson, Erie, CO (US); Hong Li, Superior, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/966,908

(22) Filed: Dec. 11, 2015

(65) Prior Publication Data

US 2017/0171432 A1    Jun. 15, 2017

(51) Int. Cl.
- *H04N 1/60* (2006.01)
- *G06F 3/12* (2006.01)
- *G06K 15/02* (2006.01)

(52) U.S. Cl.
CPC ........... *H04N 1/603* (2013.01); *G06F 3/1204* (2013.01); *G06F 3/1254* (2013.01); *G06F 3/1275* (2013.01); *G06K 15/1836* (2013.01); *H04N 1/6008* (2013.01); *H04N 1/6097* (2013.01); *H04N 2201/0039* (2013.01)

(58) Field of Classification Search
USPC ........................................................ 358/1.13
See application file for complete search history.

(56) References Cited

U.S. PATENT DOCUMENTS

| | | | |
|---|---|---|---|
| 6,480,301 B1 * | 11/2002 | Cholewo | G06T 11/001 358/1.9 |
| 7,933,042 B2 | 4/2011 | Kametani | |
| 8,390,886 B2 | 3/2013 | Willamowski et al. | |
| 8,570,559 B2 | 10/2013 | Koh et al. | |
| 8,842,335 B2 * | 9/2014 | Yamaguchi | H04N 1/6097 358/1.9 |
| 2006/0005727 A1 * | 1/2006 | Nishitani | H04N 1/46 101/484 |
| 2010/0238461 A1 | 9/2010 | Chauvin et al. | |
| 2013/0321827 A1 | 12/2013 | Liebelt et al. | |
| 2015/0201111 A1 | 7/2015 | Takasaki | |

* cited by examiner

*Primary Examiner* — Ngon Nguyen
(74) *Attorney, Agent, or Firm* — Alpine Technology Law Group LLC

(57) ABSTRACT

A printing system is described. The printing system includes a printer having a control unit to perform color mapping from an input color space defined in a printer input profile to a printer color space defined in a printer output profile and a printing condition matching module to automatically determine a printer input profile based on a selection of one of a plurality of printing conditions, wherein a printer input profile corresponds to each of the plurality of printing conditions.

21 Claims, 7 Drawing Sheets

MECHANISM FOR AUTOMATICALLY DETERMINING INPUT PROFILES

FIELD

This invention relates generally to the field of printing systems. More particularly, the invention relates to color management workflow.

BACKGROUND

Growth in color management has resulted in an increase in software packages that are used to generate International Color Consortium (ICC) profiles. ICC profiles describe color attributes of a particular device or viewing requirement by defining mappings between device color space and device independent color space. Typically profiles created by a standard organization, e.g., International Organization for Standardization (ISO) are selected as printer input profiles when printing cyan, magenta, yellow, black (CMYK) print jobs.

A printer input profile is used to convert jobs from the source's color space to the device independent color space. A printer output profile is used to convert colors from the device independent color space to the destination printer's color space. Each standard printer profile was created based on a specific printing condition (e.g., paper attributes, such as finish, weight, rendering intention, etc.) and defines the color gamut of the profile. A color gamut refers to a subset of colors that can be accurately represented in a given circumstance by a certain device. A common problem occurs when printing CMYK jobs in that the printing condition of a selected printer input profile unlikely matches a selected printing condition on a printer at which the job is to be printed. Accordingly, a significant mismatch occurs between the printer input profile gamut and the printer output profile gamut. Such a mismatch results in an inability to correctly produce many colors, or the color capacity of the printer not being entirely used.

SUMMARY

In one embodiment, a method is disclosed. The method includes automatically determining a printer input profile based on a selection of one of a plurality of printing conditions, wherein a printer input profile corresponds to each of the plurality of printing conditions.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A mechanism for automatically determining printer input profiles is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1A:
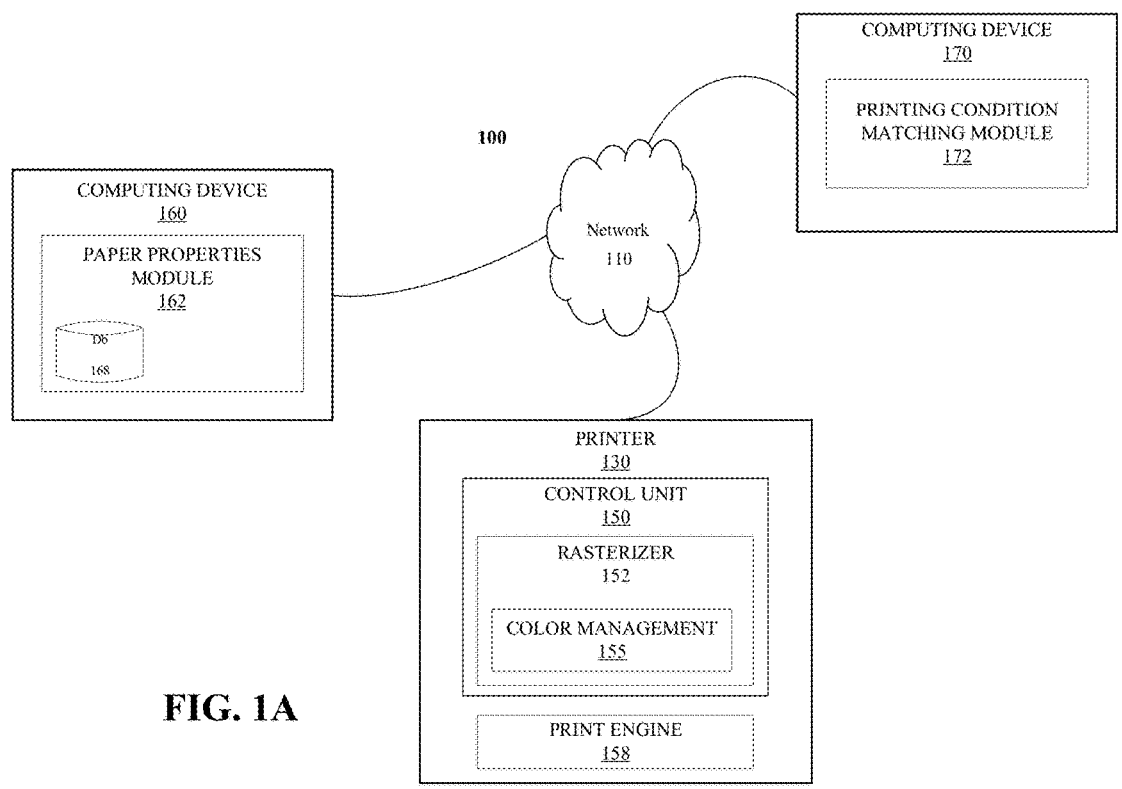
FIGS. 1A & 1B illustrate embodiments of a printing system.
Figure 1B:
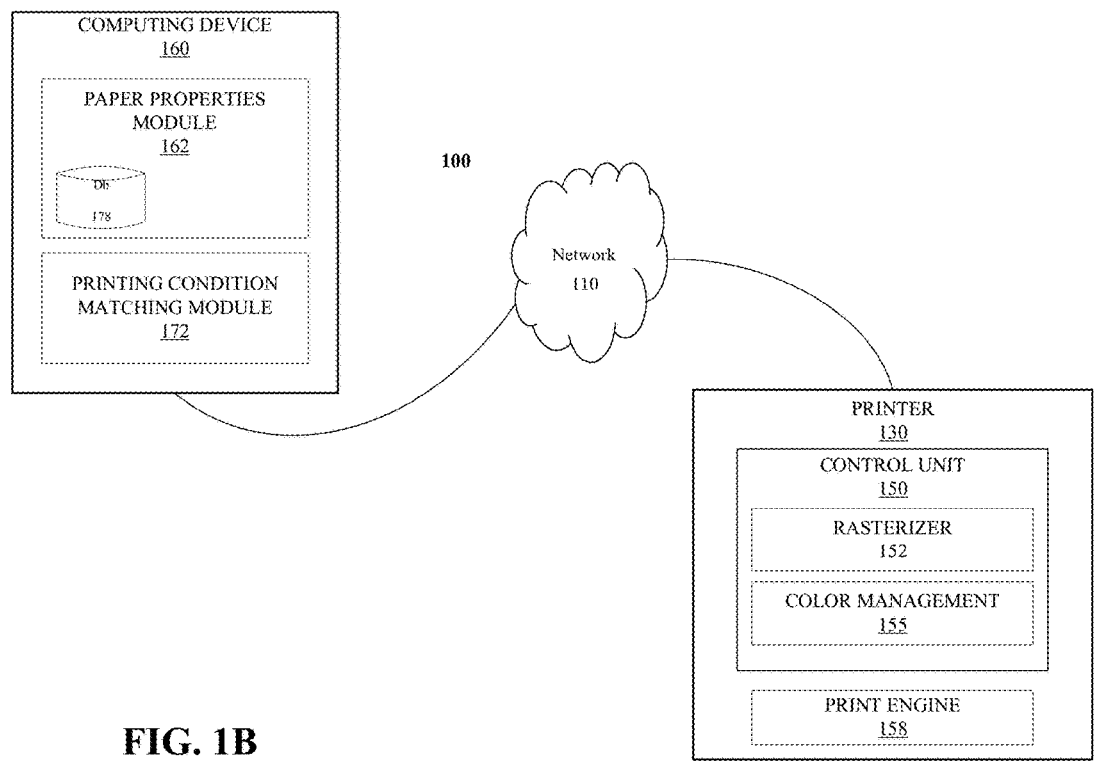

FIG. 1A illustrates one embodiment of a printing system 100. Printing system 100 includes a printer 130 and computing devices 160 and 170. In one embodiment, printer 130, computing device 160 and computing device 170 communicate via a network 110. However, printing system may have other configurations. For example, FIG. 1B illustrates an embodiment of printing system 100 in which components of computing device 170 are combined with computing device 160, which communicates with printer 130 via network 110. In one embodiment, computing devices 160, 170 and printer 130 may also be combined. Throughout this document, terms like "logic", "component", "module", "framework", "engine", "point", and the like, may be referenced interchangeably and include, by way of example, software, hardware, and/or any combination of software and hardware, such as firmware.

It is contemplated that any number and type of components may be added to and/or removed from printing system 100 to facilitate various embodiments including adding, removing, and/or enhancing certain features. For brevity, clarity, and ease of understanding of printing system 100, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Printer 130 includes a control unit 150 and a print engine 158. According to one embodiment, control unit 150 processes and renders objects received in print job data 120 and provides sheet maps for printing to print engine 158. Control unit (i.e. DFE or digital front end) 150 includes a rasterizer 152 that is implemented to process image objects received at control unit 150 by a raster image processor (RIP) to convert an image described in a vector graphics format (e.g., shapes) into a raster image (e.g., pixels) that is to be stored as scan line data in a memory array (not shown) for output to print engine 158.

Rasterizer 152 includes a color management unit 155 that provides a color mapping from an input color space to a printer 130 color space. In one embodiment, color management unit 210 uses ICC profiles to perform a color managed workflow by mapping to determine CMYK values for each pixel in a particular object to be printed at print engine 158.

In a further embodiment, color management unit 155 includes ICC profiles and color lookup tables (CLUTs) (not shown).

Figure 2:
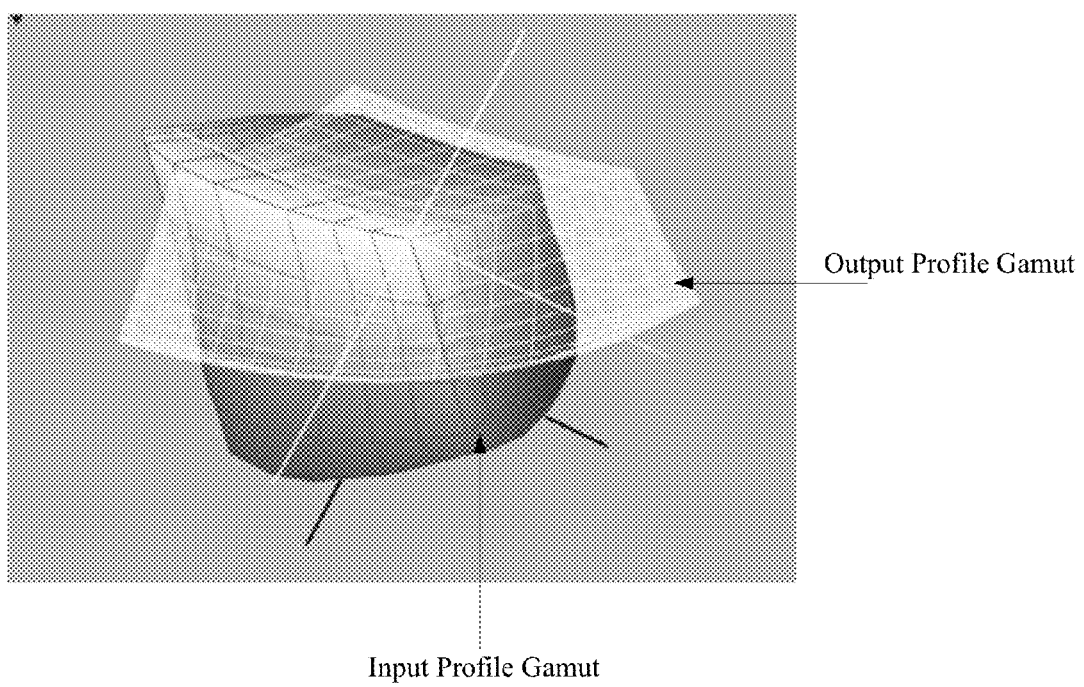
FIG. 2 illustrates one embodiment of input and output color gamuts.

As discussed above, printer 130 may encounter mismatch problems between the printer input profile gamut and the printer output profile gamut, resulting in an inability to correctly produce many colors, or the color capacity of the printer not being entirely used. FIG. 2 illustrates one embodiment of such a mismatch. As shown in FIG. 2, areas of the printer input profile gamut uncovered by the printer output profile gamut represent colors that cannot be reproduced by printer 130. Conversely, areas of the printer output profile gamut that extend beyond the printer input profile gamut represent printer 130 color capacity that is not completely used.

According to one embodiment, a mechanism is provided to automatically determine a CMYK ICC printer input profile based on selected printing conditions. Referring back to FIG. 1A, such an embodiment features a printing condition matching module 172 at computing device 170 that may determine an optimized printer input profile when there is no match between a printer condition and an ISO standard printer input profile's printing condition.

In one embodiment, printing condition matching module 172 determines printer input profile based on parameters corresponding to printing conditions selected at printer 130 and the printer output profile. However, printing condition matching module 172 may also select a printer input profile based on printing condition parameters and either characterization data or a printer output profile received from paper properties module 162.

In a further embodiment, paper properties module 162 generates a printer profile for each printing condition, which are stored in a database 168. Each printing condition is defined according to an ICC profile and a corresponding parameter, which includes characterization data for the printing condition. In one embodiment, the characterization data describes a corresponding paper type and surface (e.g., coated, weight, gloss, whiteness, fluorescence, laminate, etc.), halftone screen, intention of printing etc. In one embodiment, database 168 maintains paper parameters for eight printing conditions defined for the offset printing in ISO 12647-2, and seven printing conditions for general printing in ISO 15339. However other embodiments may feature paper parameters for additional printing conditions. Printer profiles are generated with the printing condition parameters and printer characterization data using known methods.

Figure 3:
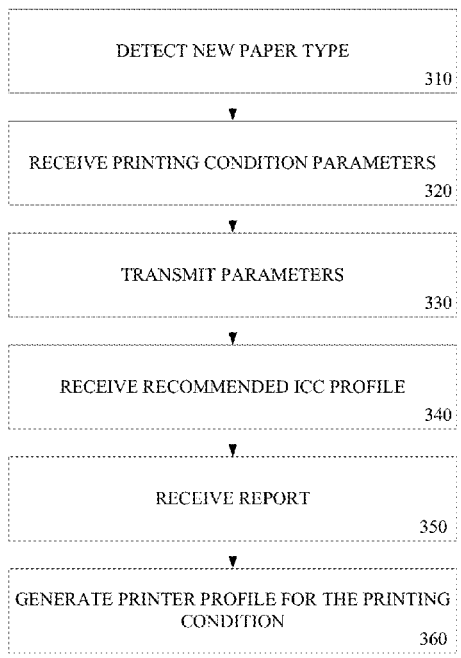
FIG. 3 is a flow diagram illustrating one embodiment of a process performed by a paper properties module.

FIG. 3 is a flow diagram illustrating one embodiment of a process performed by paper properties module 162 to obtain a printer input profile for a printing condition. At processing block 310, a new paper type is detected as being entered at paper properties module 162. At processing block 320, printing condition parameters for the paper type is received. In one embodiment, a Page Definition Format (PDF) file with a set of characterization color patches (e.g., repeated and randomized) is printed at printer 130 with the printing condition and subsequently analyzed with a spectrophotometer (not shown) to obtain the printer's characterization data. This characterization data contains a set of data in the printer colors space and the corresponding measurements. Thus this characterization data can determine the printer gamut and the printer color characteristics under one set of printing conditions.

At processing block 330, the printing condition parameters and characterization data is transmitted to printing condition matching module 172 for printer input profile selection. Alternatively, the printing condition parameters and printer output profile is transmitted to the printing condition matching module 172 for printer input profile selection. At processing block 340, a recommended ICC printer input profile corresponding to the printing condition parameters and characterization data is received from printing condition matching module 172. The received printer input profile may be either an identifying profile name or the profile. At processing block 350, optionally a report is received from printing condition matching module 172.

According to one embodiment, the report includes a percentage of colors in the gamut of the above ISO standards that cannot be produced at printer 130 with the selected printing condition, a percentage of colors in the gamut of the selected printing condition that are not implemented by using the printer input profile; and a maximum, and larger, errors outside the printer 130 gamut, as well as the color regions at which these errors reside. At processing block 360, the printer output profile is optionally generated for the printing condition with the printing conditions parameters and printer characterization data using known methods, and is stored at database 168 with a metadata tag.

Once generated, printer profiles are installed at control unit 150 with a metadata tag containing the parameters of printing conditions. Additionally, CMYK ICC printer profiles may be installed at printing condition matching module 172 or paper properties module 162 with a metadata tag containing the parameters of printing conditions.

Figure 4:
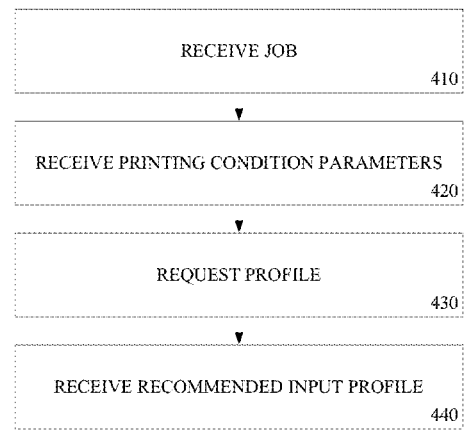
FIG. 4 is a flow diagram illustrating one embodiment of a process performed by a printer control unit.

FIG. 4 is a flow diagram illustrating one embodiment of a process performed by control unit 150 during print job processing. At processing block 410, a CMYK job without a printer input profile submitted to print via color management module 155 is received.

At processing block 420, control unit 150 receives printing conditions for the job. Control unit 150 may receive the printing conditions from a metadata tag in a selected printer output profile, or in a selection from the paper catalog. The paper catalog includes definitions of all paper types that can be loaded into a tray or fed as a roll through printer 130. In one embodiment, a user selects which paper is currently loaded in an input tray, and all parameters defining the paper loaded with the selection. If the control unit can match the selected printing condition parameters to the printing conditions parameters metadata of a printer input profile, then it may select that printer input profile. Otherwise, at processing block 430, control unit 150 requests the recommended printer input profile. The request may be made to either printing condition matching module 172 and/or paper properties module 162. The request includes the selected printing condition parameters and the printer output profile. At processing block 440, the printer input profile is received and automatically selected by control unit 150.

Figure 5:
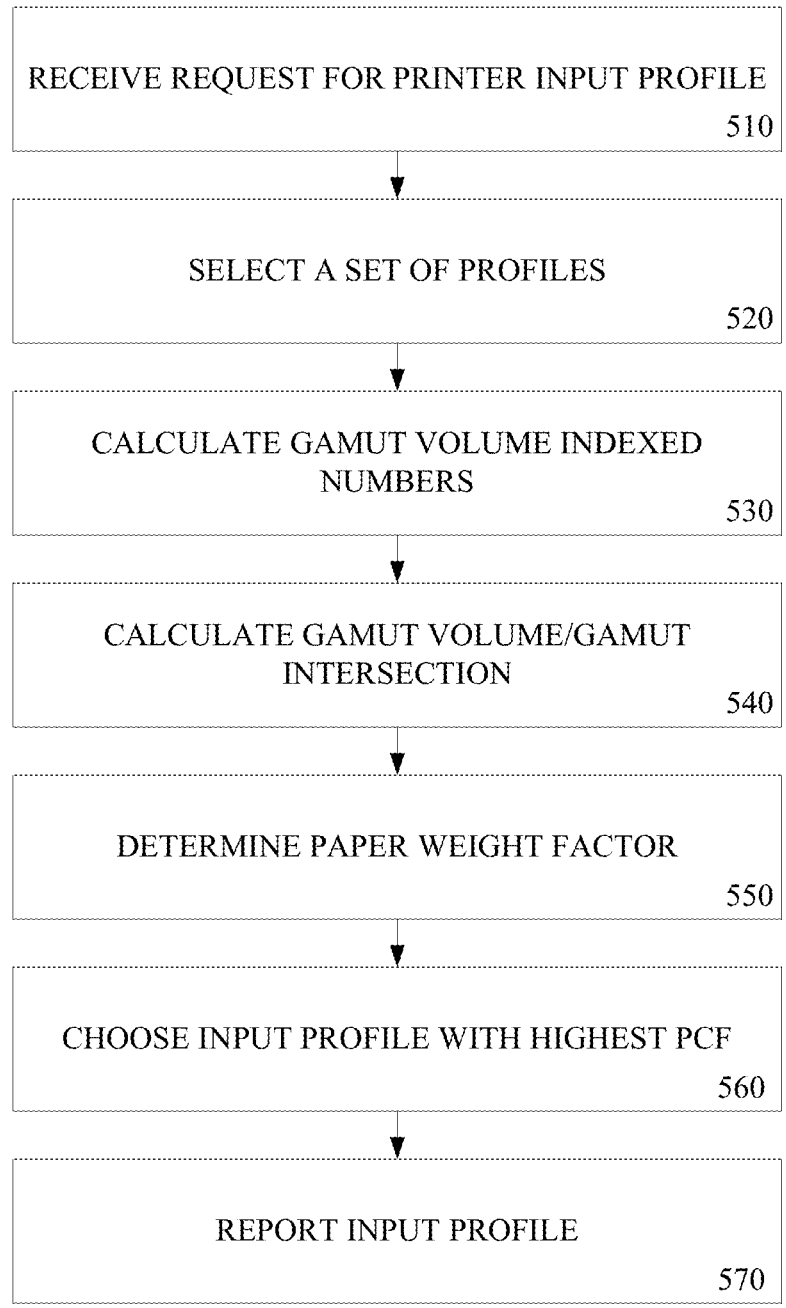
FIG. 5 is a flow diagram illustrating one embodiment of a process for determining a printer input profile.

FIG. 5 is a flow diagram illustrating one embodiment of a process performed by printing condition matching module 172 to determine a printer input profile. At processing block 510, a request is received to select a recommended printer input profile accompanied by printing condition parameters and either a printer output profile or characterization data. If the request matches a previous request, then the process may skip to processing block 570 and the previously determined input printer profile may be returned. The printer input profile corresponding to the printing condition parameters is determined based on a printing condition fit number (PCF). In one embodiment, the PCF is defined as a linear combination of a few paper parameters. At processing block 520, a set of printer input profiles is first selected based on paper surface (e.g., if the paper is coated, choose all ISO input profiles with the coated paper printing conditions). These candidate printer input profiles are stored in the printing condition matching module 172.

At processing block 530, gamut volume indexed numbers (VI) are calculated. In one embodiment, the gamut volume index is defined as $V0^2/(Vs*Vp)$ where Vs is the gamut volume of chosen printing condition, Vp is the printer gamut with the selected printing condition, and V0 is the intersection of Vp and Vs. Vs is calculated for the selected printer input profiles using known methods. Vp is calculated for either the printer output profile or the characterization data using known methods. At processing block 540, a gamut volume/gamut intersection is calculated based on a method of Delaunay triangulation.

At processing block 550, a paper weight factor (PW) is determined. In one embodiment, 1 is assigned to PW if the paper weight falls within the weight range. Otherwise 0 is assigned. Thus, PCF=0.8*VI+0.2*PW. At processing block 560, a printer input profile with the printing condition associated with the highest PCF value is chosen. At processing block 570, an ISO standard input profile is selected (e.g., from an ISO 12647-2 and 15339, respectively) and is reported to the requester paper properties module 162 or control unit 150. The request for printer input profile may be stored so that future requests that are the same as prior requests may return the previously determined printer input profile directly without calculating PCF.

Figure 6:
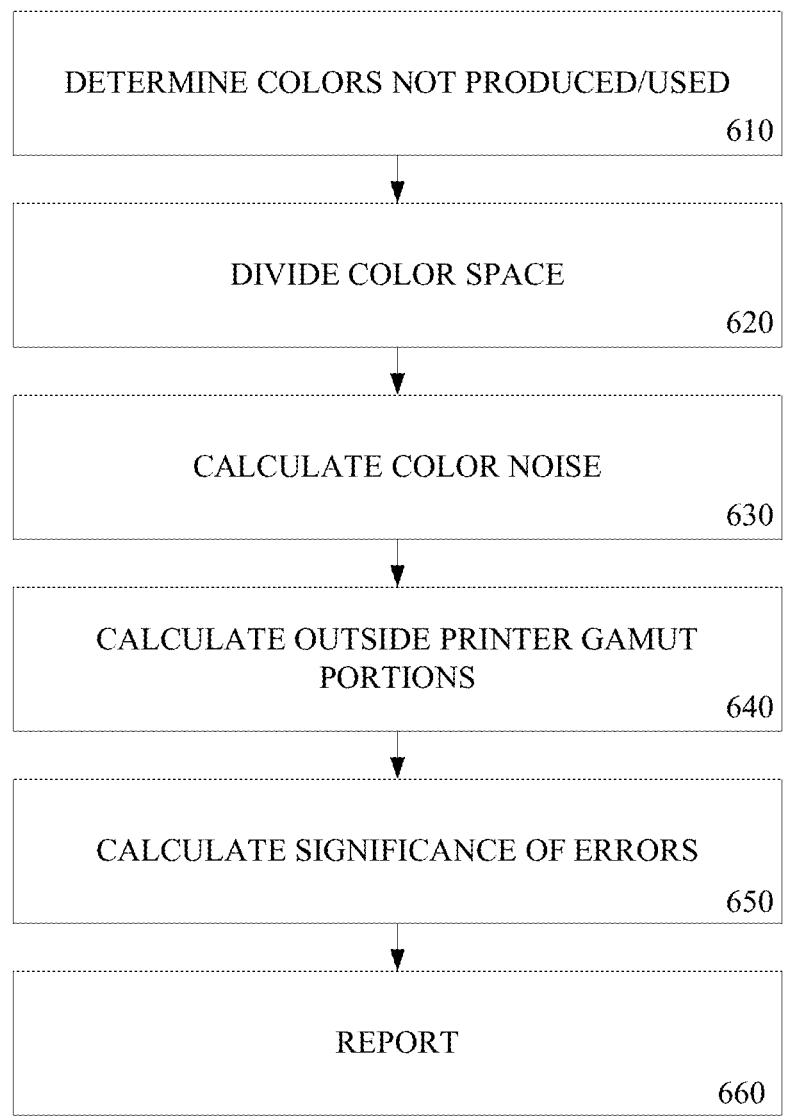
FIG. 6 is a flow diagram illustrating one embodiment of a reporting process.

FIG. 6 is a flow diagram illustrating one embodiment of a reporting process performed by printing condition matching module 172. At processing block 610, printing condition matching module 172 determines the percentage of colors in the ISO standards that cannot be produced, and the percentage of colors in the gamut of the selected printing condition that are not used. At processing block 620, the color space is divided into a few non-equally spaced regions based on the human perception. For example, red, orange, yellow, chateaus, cyan, blue, purple and magenta.

At processing block 630, the color repeatability (or noise) is calculated in each region. At processing block 640, the outside printer gamut portions are calculated for each color region. At processing block 650, the significance of errors is calculated based on the color repeatability and the gamut mapping error. At processing block 660, the significant errors in the color regions are reported to paper properties module 162.

Figure 7:
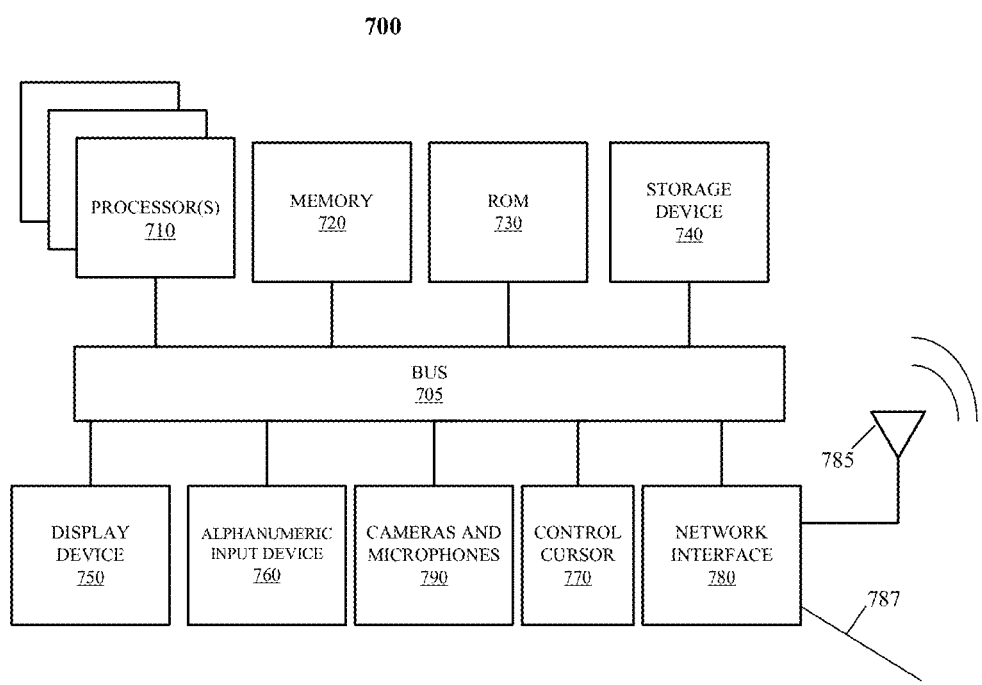
FIG. 7 illustrates a computing device suitable for implementing embodiments of the present disclosure.

FIG. 7 illustrates a computing device (e.g., computing devices 160 and 170 and controller 150) suitable for implementing embodiments of the present disclosure. Computing system 700 includes bus 705 (or, for example, a link, an interconnect, or another type of communication device or interface to communicate information) and processor 710 coupled to bus 705 that may process information. While computing system 700 is illustrated with a single processor, electronic system 700 and may include multiple processors and/or co-processors, such as one or more of central processors, graphics processors, and physics processors, etc. Computing system 700 may further include random access memory (RAM) or other dynamic storage device 520 (referred to as main memory), coupled to bus 705 and may store information and instructions that may be executed by processor 710. Main memory 720 may also be used to store temporary variables or other intermediate information during execution of instructions by processor 710.

Computing system 700 may also include read only memory (ROM) and/or other storage device 730 coupled to bus 705 that may store static information and instructions for processor 710. Date storage device 740 may be coupled to bus 705 to store information and instructions. Date storage device 740, such as magnetic disk or optical disc and corresponding drive may be coupled to computing system 700.

Computing system 700 may also be coupled via bus 705 to display device 750, such as a cathode ray tube (CRT), liquid crystal display (LCD) or Organic Light Emitting Diode (OLED) array, to display information to a user. User input device 760, including alphanumeric and other keys, may be coupled to bus 705 to communicate information and command selections to processor 710. Another type of user input device 760 is cursor control 770, such as a mouse, a trackball, a touchscreen, a touchpad, or cursor direction keys to communicate direction information and command selections to processor 710 and to control cursor movement on display 750. Camera and microphone arrays 790 of computer system 700 may be coupled to bus 705 to observe gestures, record audio and video and to receive and transmit visual and audio commands.

Computing system 700 may further include network interface(s) 780 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 780 may include, for example, a wireless network interface having antenna 785, which may represent one or more antenna(e). Network interface(s) 780 may also include, for example, a wired network interface to communicate with remote devices via network cable 787, which may be, for example, an Ethernet cable, a coaxial cable, a fiber optic cable, a serial cable, or a parallel cable.

Network interface(s) 780 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 780 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 780 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 700 may vary from implementation to implementation depending upon numerous factors, such as price constraints, performance requirements, technological improvements, or other circumstances. Examples of the electronic device or computer system 700 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A printing system comprising:
   a memory to store a printing condition matching module; and
   a processor execute the printing condition matching module to automatically determine a printer input profile based on a selection of one of a plurality of printing conditions at the printing system and to report the printer input profile, wherein the printer input profile is selected from among a plurality of candidate printer input profiles based on an association with a printing condition having a highest printing condition fit number (PCF).

2. The printing system of claim 1, wherein selecting the printer input profile at the printing condition matching module comprises:
   selecting the candidate printer input profiles based on paper surface;
   determining a PCF for each candidate printer input profile, including:
      calculating gamut volume indexed numbers (VI);
      calculating gamut volume/gamut intersection; and
      determining a paper weight factor (PW); and
   selecting the printer input profile from the candidate input profiles having the printing condition associated with a highest PCF value.

3. The printing system of claim 2, wherein selecting the printer input profile at the printing condition matching module further comprises:
   determining a percentage of colors in the input profile that cannot be produced;
   determining a percentage of colors in a gamut of the selected printing condition that are not used;
   dividing a color space into regions based on human perception;
   calculating a color repeatability in each of the color space regions;
   calculating outside printer gamut portions for each color region; and
   reporting significant errors in the color regions to the paper properties module.

4. The printing system of claim 1, wherein the printing condition matching module automatically determines the printer input profile based on a printer output profile and the plurality of printing conditions.

5. The printing system of claim 4, further comprising a printer having a control unit to perform color mapping from an input color space defined in an input profile to a printer color space defined in an output profile.

6. The printing system of claim 5, wherein the printing condition matching module automatically determines a second printer input profile based on printing condition parameters and the printer output profile received from the control unit.

7. The printing system of claim 6, wherein the control unit receives a print job including a request to perform color mapping, retrieves a metadata tag corresponding to a selected printer profile and receives a recommended printer input profile corresponding to the selected printer profile.

8. The printing system of claim 1, wherein the printing condition matching module automatically determines the printer input profile based on characterization data and the plurality of printing conditions.

9. The printing system of claim 8, wherein the characterization data describes the printer color space and corresponding measurements under one set of printing conditions.

10. The printing system of claim 9, wherein the printing condition matching module automatically determines a second printer input profile based on printing condition parameters and the characterization data.

11. The printing system of claim 10, wherein the memory further to store a paper properties module, and the processor to execute the paper properties module to generate and store an output printer profile for each of the plurality of printing conditions.

12. The printing system of claim 11, wherein the paper properties module receives errors in the color regions from the printing condition matching module.

13. The printing system of claim 1, further comprising a printer operable to receive a print job and to print processed sheet maps.

14. At least one non-transitory computer readable medium having instructions stored thereon, which when executed by one or more processors, cause the processors to:
receive a selection of one of a plurality of printing conditions;
automatically determine a printer input profile based on the selection of one of the plurality of printing conditions, wherein the printer input profile is selected from among a plurality of candidate printer input profiles based on an association with a printing condition having a highest printing condition fit number (PCF); and
report the printer input profile.

15. The at least one computer readable medium of claim 14, wherein selecting the printer input profile comprises:
selecting the candidate printer input profiles based on paper surface;
determining a PCF for each candidate printer input profile, including:
calculating gamut volume indexed numbers (VI);
calculating gamut volume/gamut intersection; and
determining a paper weight factor (PW); and
selecting the printer input profile from the candidate input profiles having the printing condition associated with a highest PCF value.

16. The at least one computer readable medium of claim 15, wherein selecting the printer input profile further comprises:
determining a percentage of colors in the input profile that cannot be produced;
determining a percentage of colors in a gamut of the selected printing condition that are not used;
dividing a color space into regions based on human perception;
calculating a color repeatability in each of the color space regions;
calculating outside printer gamut portions for each color region; and
reporting significant errors in the color regions to the paper properties module.

17. The at least one computer readable medium of claim 14, having instructions stored thereon, which when executed by one or more processors further causes the processors to automatically determine the printer input profile based on a printer output profile and the plurality of printing conditions.

18. The at least one computer readable medium of claim 17, having instructions stored thereon, which when executed by one or more processors further causes the processors to automatically determine a second printer input profile based on printing condition parameters and the printer output profile received from a control unit.

19. The at least one computer readable medium of claim 14, having instructions stored thereon, which when executed by one or more processors further causes the processors to automatically determine second printer input profile based on characterization data and the plurality of printing conditions.

20. The at least one computer readable medium of claim 19, wherein the characterization data describes the printer color space and corresponding measurements under one set of printing conditions.

21. The at least one computer readable medium of claim 20, having instructions stored thereon, which when executed by one or more processors further causes the processors to automatically determine a second printer input profile based on printing condition parameters and the characterization data.

* * * * *